United States Patent [19]

Ito

[11] Patent Number: 5,996,094
[45] Date of Patent: *Nov. 30, 1999

[54] COMMUNICATIONS TERMINAL AND COMMUNICATIONS SYSTEM

[75] Inventor: Kan Ito, Machida, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/786,910

[22] Filed: Jan. 22, 1997

Related U.S. Application Data

[63] Continuation of application No. 08/352,081, Nov. 30, 1994, abandoned.

[30] Foreign Application Priority Data

Dec. 2, 1993 [JP] Japan ................................ 5-302909

[51] Int. Cl.⁶ ........................................ G06F 11/00
[52] U.S. Cl. ................................................... 714/57
[58] Field of Search ........................ 395/185.1, 185.01, 395/185.09, 183.19, 182.02, 182.08, 182.09, 182.1, 200.11, 200.69; 714/4, 10, 11, 48, 57, 43; 709/239

[56] References Cited

U.S. PATENT DOCUMENTS

| | | | |
|---|---|---|---|
| 4,503,535 | 3/1985 | Budde et al. ................. | 395/184.01 |
| 4,529,842 | 7/1985 | Levy et al. ................... | 395/182.02 |
| 4,807,228 | 2/1989 | Dahbura et al. ............. | 395/182.11 |
| 5,109,384 | 4/1992 | Tseung ......................... | 395/182.02 |
| 5,134,501 | 7/1992 | Satomi et al. ................ | 358/400 |
| 5,155,842 | 10/1992 | Rubin ........................... | 395/185.1 |
| 5,181,204 | 1/1993 | Kasman ........................ | 395/183.21 |
| 5,218,601 | 6/1993 | Chujo et al. ................. | 395/183.19 |
| 5,239,537 | 8/1993 | Sakauchi ...................... | 395/183.19 |
| 5,325,156 | 6/1994 | Ulinski ......................... | 395/183.22 |
| 5,367,667 | 11/1994 | Wahlquist et al. ........... | 395/183.22 |
| 5,432,715 | 7/1995 | Shigematsu et al. ......... | 395/185.1 |
| 5,487,148 | 1/1996 | Komori et al. ............... | 395/182.02 |
| 5,712,968 | 1/1998 | Nakayama et al. .......... | 395/182.02 |

*Primary Examiner*—Robert W. Beausoliel, Jr.
*Assistant Examiner*—Pierre Eddy Elisca
*Attorney, Agent, or Firm*—Fitzpatrick, Cella, Harper & Scinto

[57] ABSTRACT

The present invention aims to facilitate the maintenance inspection for the communications terminal and the communications system. A fault detection unit 24 monitors the communication line and each terminal unit, and upon detecting a malfunction, the fault information is immediately output to a fault information recording unit 26. The fault information recording unit 26 stores and records fault information from the fault detection unit 24. It operates to only record the fault conditions on the fault information recording unit 26 in the case of the slight fault, or record the fault conditions on the fault information recording unit 26 and automatically call the preregistered service office to notify its fault conditions in the case of the heavy fault which may hinder the television conference in performance. The fault information recording unit 26 automatically calls the registered service office periodically, e.g., once a week, to notify the fault information recorded after the previous call. When making the television conference between three or more points, the multi-point connection control unit 60 is also provided with a fault detecting unit and a fault information recording unit.

50 Claims, 4 Drawing Sheets

COMMUNICATIONS TERMINAL AND COMMUNICATIONS SYSTEM

This application is a continuation of application Ser. No. 08/352,081 filed Nov. 30, 1994, now abandoned.

BACKGROUND OF THE INVENTION

1. Field of the Invention

The present invention relates to a communications terminal and a communications system.

2. Related Background Art

In recent years, the digital communication line has been come into wide use, and the communications system making the use of the digital line network, for example, a television telephone and conference system, has attracted public attention. The standardization is presupposed for the wide spread of the communications system. Regarding the video and voice communications, five recommendations have been issued. H.221 defines the frame structure of 64 kbit/s to 1,920 kbit/s channel, H.230 defines the control signal and the notification signal of frame synchronization, and H.242 defines the mutual connection procedure up to 2 Mbit/s. Also, H.261 defines the video coding system of P×64 kbit/s (P=1 to 30), and H.320 defines the communications system configuration of voice and video.

Also, the television conference system between multi points currently used typically takes the connection form of connecting each station in star configuration around a connection control device between multi points as the center, as shown in FIG. 4. The methods for displaying the moving picture from the partner station may include switching multiple stations in time division, displaying the picture from the originating station, and setting a plurality of windows to which the moving picture from the partner station is fixedly allocated.

In the conventional communications system, for example, a television conference system, when some fault happens in the terminal device or communication line, such a procedure is taken that the user calls the maintenance department in charge such as a service center, and the maintenance inspector diagnoses the conditions of the terminal device via the communication line and repairs to the spot for the maintenance and inspection if required.

However, in the above-described maintenance inspection, the maintenance inspector had the fault generation conditions explained by the user, supposing the cause of fault within the scope to be understood by its explanation, and often could not correctly grasp the condition of each part when the fault happens, whereby it was time-consuming and inefficient to identify the cause of fault.

Also, depending on the user's knowledge regarding the television conference system, the user may call the service center upon a slight malfunction or accidental fault for which the maintenance inspection work is essentially unnecessary. This is not only troublesome for both the user and the maintenance inspector but also results in a waste of time.

SUMMARY OF THE INVENTION

An object of the present invention is provide a communications terminal and a communications system which can resolve the above-mentioned problems.

Further, it is another object of the invention to provide a communications terminal and a communications system which allows for the remote maintenance.

To accomplish such objects, according to a preferred embodiment of the present invention, there is provided a communications terminal unit which can communicate via the communication line with other communications terminals, comprising detecting means for detecting the malfunction of the communications terminal, and notification means for notifying the malfunction detected by the detecting means to a dedicated external unit preregistered except for the communications terminal.

It is a further object of the invention to provide a communications terminal and a communications system which allows for the remote maintenance depending on the degree of fault of the communications terminal or the communications system.

Furthermore, it is another object of the invention to provide a communications terminal and a communications system which can perform the multi-point communication, with the capability of notifying a fault that has happened in one communications terminal to other communications terminals.

Also, it is still another object of the invention to provide a communications terminal and a communications system having new functions.

Other objects and features of the present invention will become apparent from the following detailed description and the accompanying drawings.

DETAILED DESCRIPTION OF THE PREFERRED EMBODIMENTS

The preferred embodiments of the present invention will be now described with reference to the drawings.

Figure 1:
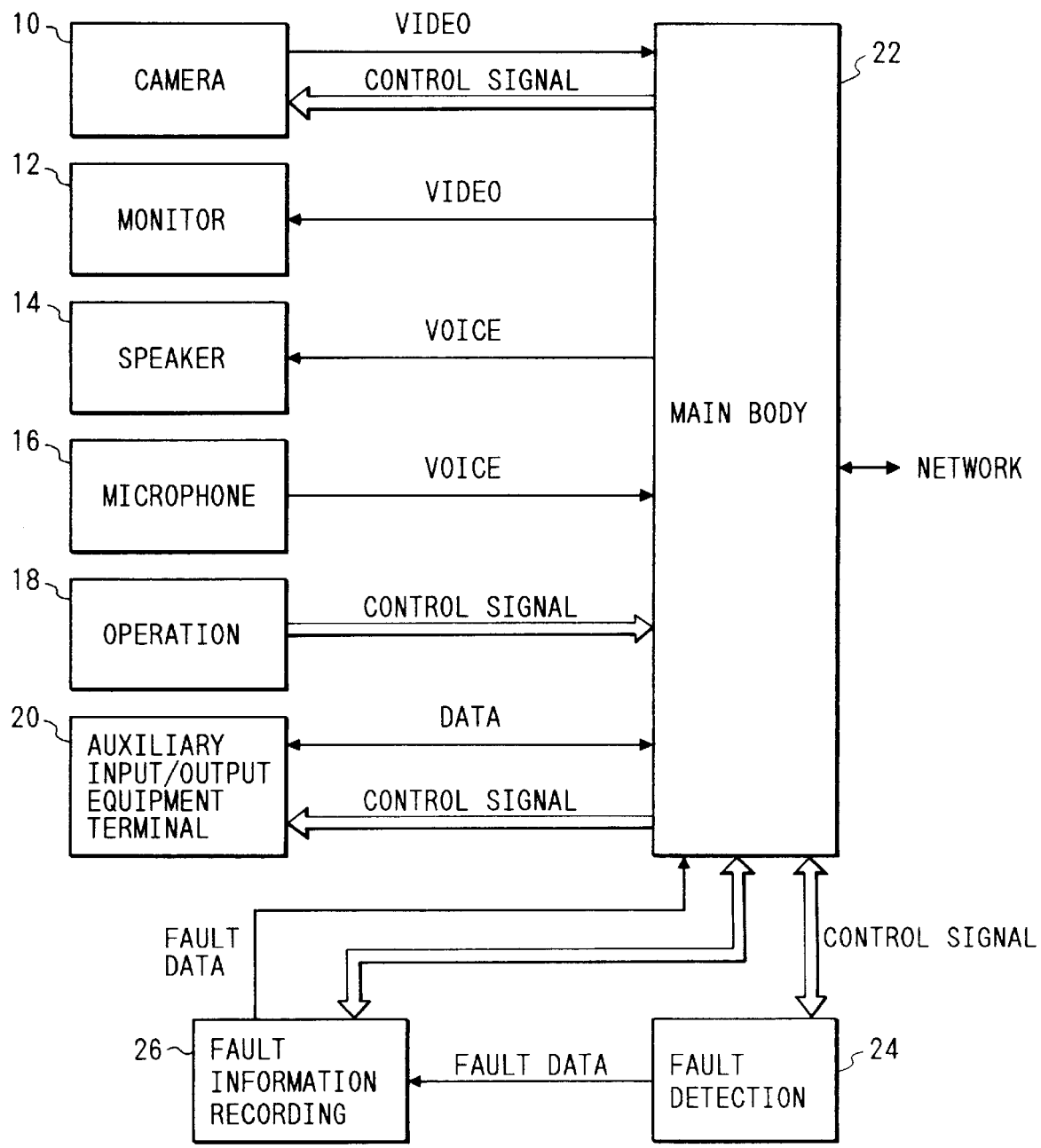
FIG. 1 is a schematic configuration block diagram of a terminal device according to one embodiment of the present invention.

FIG. 1 is a schematic configuration block diagram of a television conference terminal device according to one embodiment of the invention. In FIG. 1, 10 is a video camera for photographing the conference participant of the self station, 12 is a monitor for video displaying the photographed image of the self or other conference participation station, 14 is a speaker, 16 is a microphone, 18 is an operation unit for operating the control for camera pans, tilt, and zoom for the self station and other stations, as well as the switching control of camera, 20 is an auxiliary input/output equipment terminal such as a computer keyboard, an input unit of still image, a digitizer for inputting the plotting image, and a sub-monitor for displaying the image of other auxiliary equipment, and 22 is a main body of this terminal.

24 is a fault detection unit for detecting the fault such as a malfunction of components of this terminal and the communication line connecting to this terminal, and 26 is a fault information recording unit for recording fault information detected by the fault detection unit 24 on the predetermined recording medium for preservation. The fault information recording unit 26 consists of, for example, a hard disk unit, a semiconductor memory unit, an optical disk unit and a magneto-optical disk unit.

Figure 2:
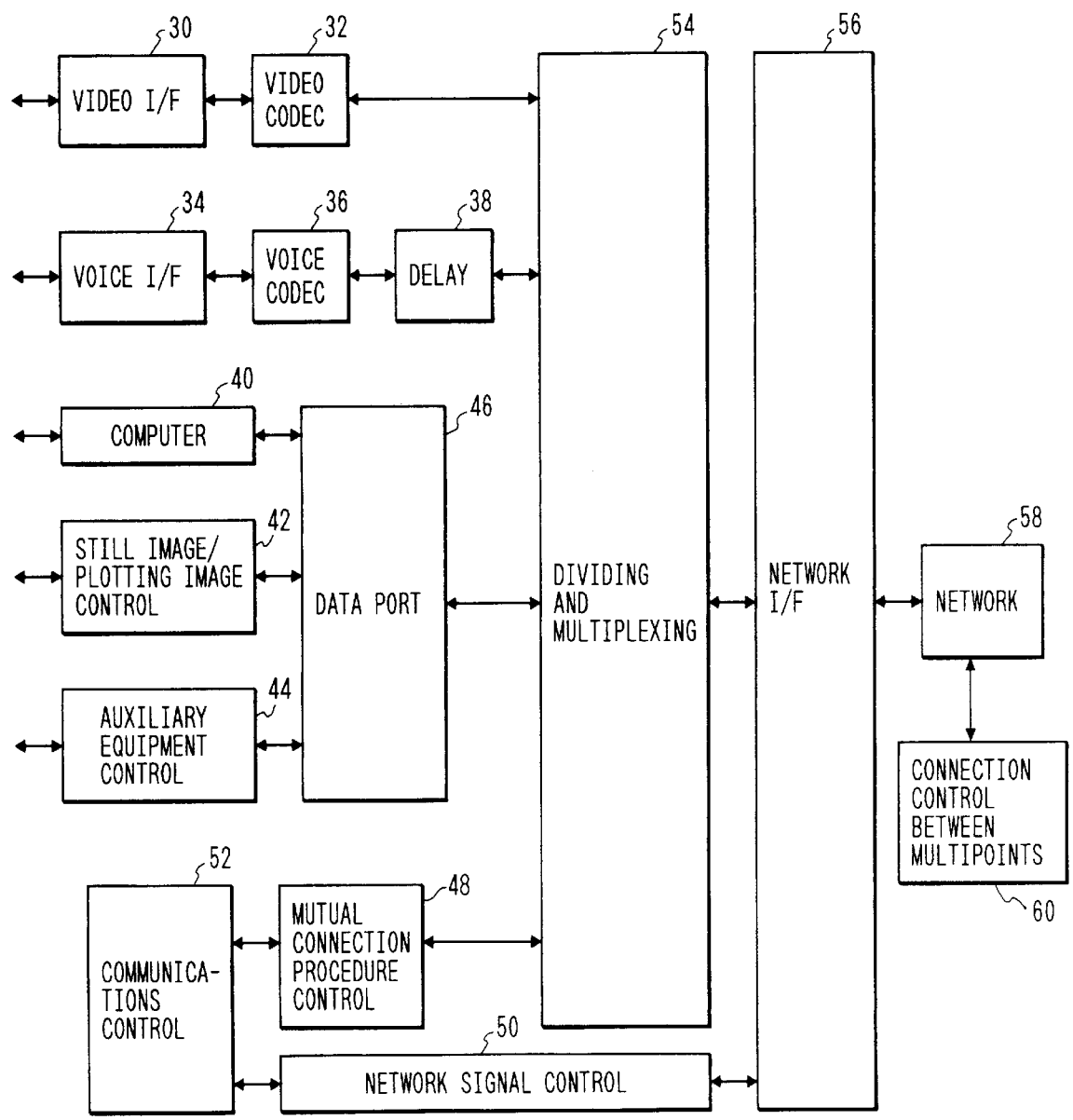
FIG. 2 is a schematic configuration block diagram of a main unit of FIG. 1.

FIG. 2 shows the details of the main body 22. In FIG. 2, 30 is a video interface for the connection of the camera 10 and the monitor 12, having the image processing functions including a screen division, an image synthesis and a character synthesis in making the multi-point television conference. 32 is a video encoding/decoding circuit (codec) for encoding the video signal from a video interface 30 and decoding received coded video information.

34 is a voice interface for the connection of the speaker 14 and the microphone 16, having the voice processing functions including an echo cancel function. 36 is a voice encoding/decoding circuit (codec) for encoding the voice signal and decoding received voice information. 38 is a delay circuit for delaying a predetermined period coded voice information and received coded voice information with the voice encoding/decoding circuit 36, for the synchronization with video information, i.e., provided to implement a lip sink.

40 is a computer for providing a television conference function and a computer conference function, 42 is a still image/plotting image control circuit for controlling the input/output of still image and plotting image of the auxiliary input/output equipment terminal 20, and 44 is an auxiliary equipment control circuit for controlling the auxiliary equipment of the auxiliary input/output equipment terminal. 46 is a data port for the data transfer to and from the auxiliary input/output equipment terminal 20 via the computer 40, the still image/plotting image control circuit 42 and the auxiliary equipment control circuit 44.

48 is a mutual connection procedure control circuit for controlling the mutual connection with other terminals via a network, 50 is a network signal control circuit for governing the end-to-end control for establishing the common mode for the communication between terminals, and 52 is a communication control circuit for controlling the communication globally using the mutual connection procedure control circuit 48 and the network signal control circuit 50.

54 is a dividing and multiplexing circuit for the multiplex transmission of data, 56 is a network interface for the connection to a communication network 58, and 60 is a multi-point connection control unit for providing the mutual connection of multi-point television conference terminals to enable the television conference between multi-points. Note that when making a television conference between two points, i.e., two terminals, the communication may be directly made between terminals without the multi-point connection control unit 60.

First, the operation of the television conference between two points will be described below. At the early time or appropriate time when the television conference system is built up (or the television conference communications terminal is installed), the address of service office to contact in case that the fault may happen, e.g., a telephone number of the service center of maintenance in charge is registered in the fault detection unit 24 or the fault information recording unit 26 by means of the auxiliary input/output equipment terminal 20.

During the operation of the television conference system, the fault detection unit 24 monitors the communication conditions of the communication line and each terminal unit (see FIGS. 1 and 2), and if a malfunction is detected, its fault information (generation site, contents, date and time, etc.) is immediately output to the fault information recording unit 26. The fault information recording unit 26 stores and records fault information from the fault detection unit 24. In accordance with the contents of fault that has happened, it operates to only record the fault conditions on the fault information recording unit 26 in the case of the slight fault (e.g., not connected by calling once, and the moving picture or voice temporarily interrupted during connection), or record the fault conditions on the fault information recording unit 26 and automatically call the preregistered service office to notify its fault conditions in the case of the heavy fault which may hinder the television conference in performance (e.g., not connected by calling many times, the moving picture or voice kept interrupted during connection, and the line disconnected abruptly). Of course, when the communication line for the television conference is suspended, it calls the service office via another line or the already existing analog public line, not shown.

Also, the fault information recording unit 26 automatically calls the registered service office periodically, e.g., once a week, to notify the fault information recorded after the previous call. Thereby, the maintenance person in charge can grasp the conditions of each television conference terminal unit for maintenance inspection continuously.

Next, an example of making the conference between three or more points will be presented. When making the television conference between three or more points, it is preferable to provide a fault detection unit and a fault information recording unit on the multi-point connection control unit 60 as well. A specific configuration of the multi-point connection control unit 60 is shown in FIG. 3.

Figure 3:
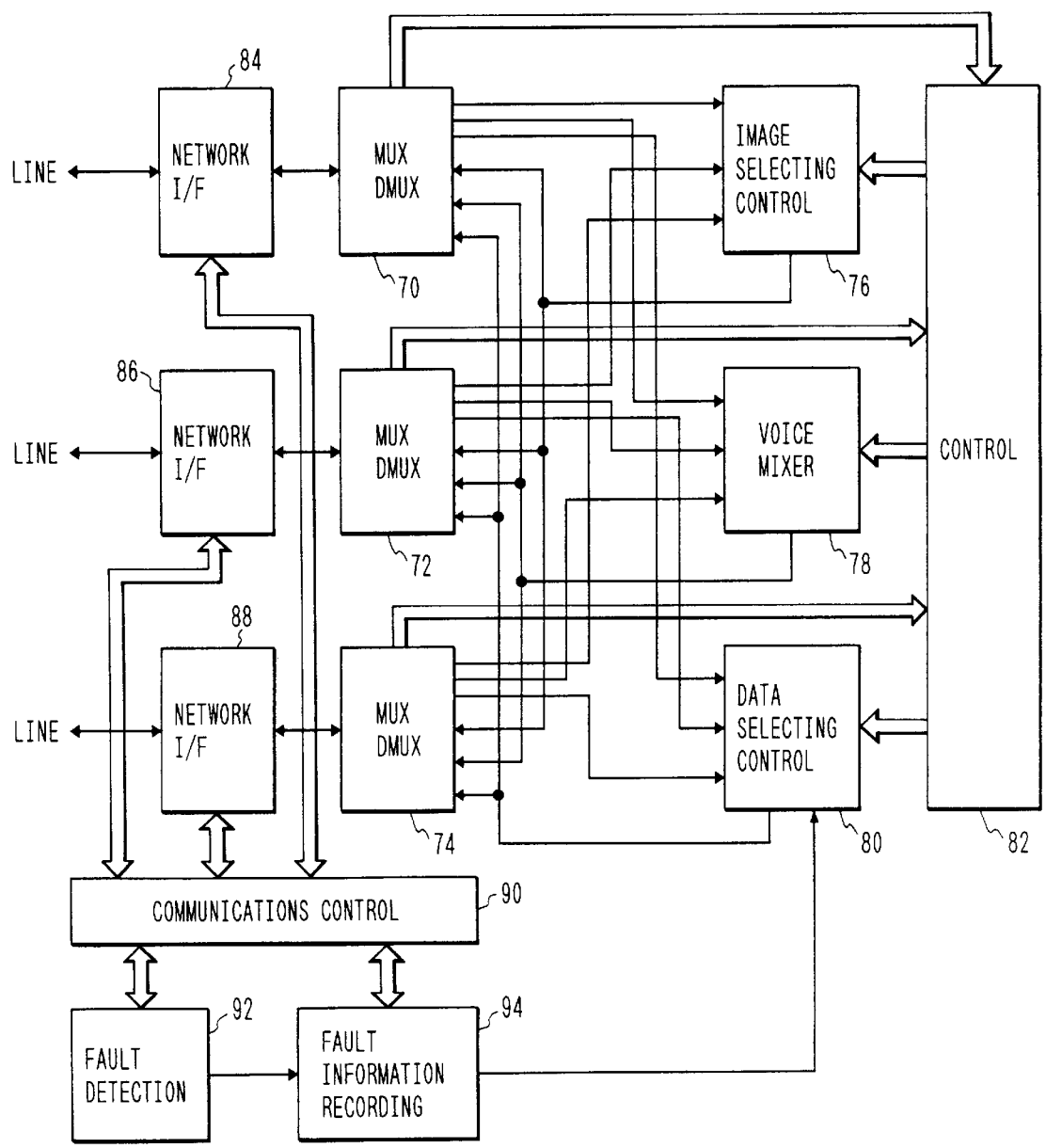
FIG. 3 is a schematic configuration block diagram of a multi-point connection control device 60.

In FIG. 3, 70, 72, 74 is a multiplexer and demultiplexer circuit for multiplexing the information (image, voice and others) to be transmitted to each terminal or demultiplexing the information entered from multiple terminals, 76 is an image selection control circuit for selecting data to be distributed from the moving picture data from each station, 78 is a voice mixer for mixing the voice from each station, 80 is a data selection control circuit for selecting other data such as still image data or computer data for distribution, and 82 is a control circuit for controlling the image selection control circuit 76, the voice mixer 78 and the data selection control circuit 80.

84, 86, 88 is a network interface for connecting a device as shown in FIG. 3 to the communication network, 90 is a communication control unit for controlling the network access to each station, 92 is a fault detection unit for detecting the fault of the line leading to each station or each equipment constituting the multi-point connection control unit 60, and 94 is a fault information recording unit for recording the fault information detected by the fault detection unit 92.

Figure 4:
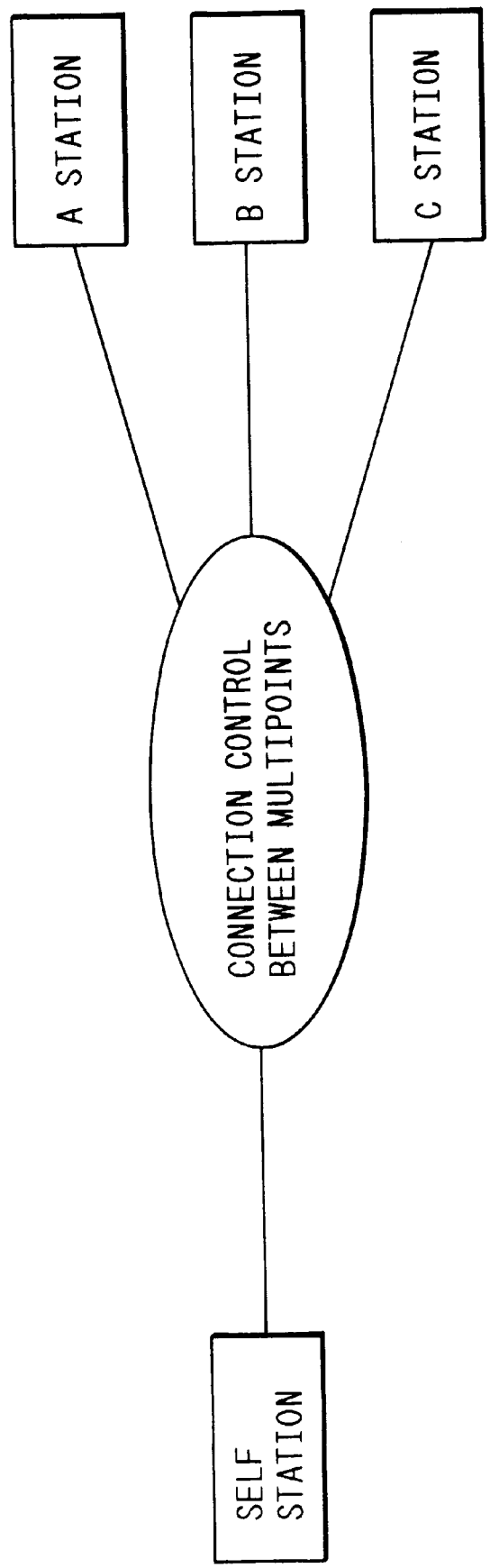
FIG. 4 is an overall configuration diagram of a multi-point connection television conference system.

Note that the network configuration in making the connection between three or more points is of a star type, as shown in FIG. 4.

When making the multi-point conference under the control of the multi-point control unit, a telephone number of the maintenance department in charge such as a service center is preregistered on the multi-point connection control unit 60, e.g., the fault information recording unit 94 or the communication control unit 90. During the operation of the television conference system, the fault detection unit 92 always monitors, for the malfunction, the communication line to each station and each section of the multi-point connection control unit 60, and upon detecting some fault, the fault information is transferred to the fault information recording unit 94. Then, as previously described, it determines the degree of fault (e.g., the noise contained in switching between image selection and data selection, the fault of voice mixing) in accordance with the conditions of fault, and operates to record the fault information on the fault information recording unit 94 in the case of the slight fault, but record the fault information on the fault information recording unit 94 in the case of the heavy fault such as interfering with the progress of the television conference (e.g., the image of a certain terminal not displayed, or the voice interrupted) and automatically call the maintenance department in charge preregistered to notify its fault conditions.

Also, the fault information recording unit 94 automatically calls the registered service office periodically, e.g., once a week, like the terminal, to notify the fault information recorded after the previous call. Thereby, the maintenance person in charge can continuously grasp the conditions of the multi-point connection control unit for the maintenance inspection.

In the multi-point television conference, when some station malfunctions due to the fault to interrupt all or partial communication during the television conference, the multi-point control unit determines the line conditions or signal form of the faulty site (the voice or image being only communicatable from each terminal) in the communication control unit 90, and notifies other stations which station caused the malfunction in the communication, due to what fault. Thereby, each station permits the communication interrupted station to identify normal operating means. If the line itself caused a malfunction, contact may be made using another communication means. Also, when the communication is interrupted in the midst of television conference, it can be determined that the line is disconnected by the partner or the communication line is cut off due to the malfunction of the apparatus or line.

The periodic contact with the maintenance department in charge may be through any of voice, facsimile and data communication, the facsimile or data communication or both being desired. For the contact for the heavy fault, if any, the use of both warning sound and facsimile is desirable. Also, at least two types of the line (analog line or digital line) may be used to deal with the malfunction in the line.

As will be easily understood from the above description, with this embodiment, the fault history in the communication line and the terminal unit can be recorded, thereby facilitating the maintenance inspection. The fault history is notified to the maintenance department in charge at every predetermined period, so that the maintenance person in charge is unnecessary to go round periodically.

Also, in the case of the heavy malfunction, the content of fault is notified to the maintenance department in charge by automatically calling, whereby the maintenance person in charge can promptly take action.

While in the above-described embodiment, a television conference system was exemplified, it is needless to say that the present invention is not limited to the television conference, but may be effective for all the communications terminals and communications systems.

What is claimed is:

1. A communications terminal unit which can communicate audio and image information with other communications terminals via communication means, said communications terminal unit comprising:
    detecting means for detecting a malfunction of said communications terminal unit; and
    processing means for notifying information of the malfunction to at least one of said other communications terminals and storing said information of the malfunction when the detected malfunction is in a first level where an interference to a communication conference occurs, and for storing information of the malfunction without the notification when the detected malfunction is in a second level where an interference to the communication conference does not occur.

2. A communications terminal unit according to claim 1, wherein the malfunction of said communications terminal unit involves an abnormality of a configuration of said communications terminal unit.

3. A communications terminal unit according to claim 1, wherein the malfunction of said communications terminal unit includes an abnormality of the communication means.

4. A communications terminal unit according to claim 1, further comprising storage means for storing the malfunction detected by said detecting means.

5. A communications terminal unit according to claim 1, wherein said stored information relating to the malfunction is transmitted to at least one of the other communications terminals every predetermined period.

6. A communications terminal unit according to claim 1, wherein the at least one of said other communications terminals is a service center for maintenance.

7. A communications terminal unit according to claim 1, wherein said processing means notifies a site at which a malfunction is generated.

8. A communications terminal unit according to claim 1, wherein said processing means notifies a date of the malfunction and a time of the malfunction.

9. A communications terminal unit according to claim 1, wherein said notification is automatically performed.

10. A communications terminal unit according to claim 1, wherein said processing means notifies the malfunction to at least one of the other communications terminals via the communication means.

11. A communication system in which a plurality of communications terminal units are connected via communication means that communicate audio and image information, said communication system comprising:
    detecting means for detecting a malfunction of one of said communications terminal units; and processing means for notifying information of the malfunction to at least one of the other communications terminal units and storing said information of the malfunction when the detected malfunction is in a first level where an interference to a communication conference occurs, and for storing information relating to said malfunction without the notification when the detected malfunction is in a second level where an interference to the communication conference does not occur.

12. A communication system according to claim 11, wherein the malfunction of said one of the communications terminal units includes an abnormality of a configuration of said one of the communications terminal unit.

13. A communications system according to claim 11, wherein the malfunction of said one of the communications terminal units includes an abnormality of the communication means.

14. A communications system according to claim 11, further comprising storage means for storing the malfunction detected by said detecting means.

15. A communications system according to claim 11, wherein said stored information relating to the malfunction is transmitted to at least one of the other communications terminal units every predetermined period.

16. A communications system according to claim 11, wherein the at least one of said other communication terminal units is a service center for maintenance.

17. A communications system according to claim 11, wherein said processing means notifies a site at which a malfunction is generated.

18. A communication system according to claim 11, wherein said processing means notifies a date of the malfunction and a time of the malfunction.

19. A communications system according to claim 11, wherein said notification is automatically performed.

20. A communications system according to claim 11, wherein said processing means notifies the malfunction to at least one of the other communications terminal units via the communication means.

21. A processing method in a communications terminal unit which can communicate audio and image information with other communications terminals via communication means, said processing method comprising the steps of:
  detecting a malfunction of said communications terminal unit; and
  notifying information of the malfunction to at least one of the other communications terminal units and storing said information of the malfunction when the detected malfunction is in a first level where an interference to a communication conference occurs, and for storing information of the malfunction without the notification when the detected malfunction is in a second level where an interference to the communication conference does not occur.

22. The processing method according to claim 21, wherein the malfunction of said communications terminal unit involves an abnormality of a configuration of said communications terminal unit.

23. The processing method according to claim 21, wherein the malfunction of said communications terminal unit includes an abnormality of the communication means.

24. The processing method according to claim 21, further comprising storing the malfunction detected.

25. The processing method according to claim 21, wherein said stored information relating to the malfunction is transmitted to at least one of the other communications terminals every predetermined period.

26. The processing method according to claim 21, wherein at least one of said other communications terminals is a service center for maintenance.

27. The processing method according to claim 21, wherein said notification step notifies a site at which a malfunction is generated.

28. The processing method according to claim 21, wherein said notification step notifies a date of the malfunction and a time of the malfunction.

29. The processing method according to claim 21, wherein said notification is automatically performed.

30. The processing method according to claim 21, wherein said notification step notifies the malfunction to at least one of the other communications terminal units via the communication means.

31. A communications terminal unit which can communicate audio and image information with other communications terminals via at least one interconnector, said communications terminal unit comprising:
  a detector, for detecting a malfunction of said communications terminal unit; and
  a processor for transmitting information of the malfunction to at least one of said other communications terminals and storing said information of the malfunction when the detected malfunction is in a first level where an interference to a communication conference occurs, and for storing information of the malfunction without the transmission when the detected malfunction is in a second level where an interference to the communication conference does not occur.

32. A communications terminal unit according to claim 31, wherein the malfunction of said communications terminal unit involves an abnormality of a configuration of said communications terminal unit.

33. A communications terminal unit according to claim 31, wherein the malfunction of said communications terminal unit includes an abnormality of the interconnector.

34. A communications terminal unit according to claim 31, further comprising memory for storing the malfunction detected by said detector.

35. A communications terminal unit according to claim 31, wherein said stored information relating to the malfunction is transmitted to at least one of the other communications terminals every predetermined period.

36. A communications terminal unit according to claim 31, wherein at least one of said other communications terminals is a service center for maintenance.

37. A communications terminal unit according to claim 31, wherein said processor transmits a site at which a malfunction is generated.

38. A communications terminal unit according to claim 31, wherein said processor transmits a date of the malfunction and a time of the malfunction.

39. A communications terminal unit according to claim 31, wherein said transmission is automatically performed.

40. A communications terminal unit according to claim 31, wherein said processor transmits the malfunction to at least one of the other communications terminals via the interconnector.

41. A communication system in which a plurality of communications terminal units are connected via at least one interconnector that communicate audio and image information, said communication system comprising:
  a detector for detecting a malfunction of one of said communications terminal units; and
  a processor for transmitting information of the malfunction to at least one of the other communications terminal units and storing said information of the malfunction when the detected malfunction is in a first level where an interference to a communication conference occurs, and for storing information relating to said malfunction without the notification when the detected malfunction is in a second level where an interference to the communication conference does not occur.

42. A communications terminal unit according to claim 41, wherein the malfunction of said communications terminal unit involves an abnormality of a configuration of said communications terminal unit.

43. A communications terminal unit according to claim 41, wherein the malfunction of said communications terminal unit includes an abnormality of at least one interconnector.

44. A communications terminal unit according to claim 41, further comprising memory for storing the malfunction detected by said detector.

45. A communications terminal unit according to claim 41, wherein said stored information relating to the malfunction is transmitted to at least one of the other communications terminals every predetermined period.

46. A communications terminal unit according to claim 41, wherein at least one of said other communications terminals is a service center for maintenance.

47. A communications terminal unit according to claim 41, wherein said processor transmits a site at which a malfunction is generated.

48. A communications terminal unit according to claim 41, wherein said processor transmits a date of the malfunction and a time of the malfunction.

49. A communications terminal unit according to claim 41, wherein said transmission is automatically performed.

50. A communications terminal unit according to claim 41, wherein said processor transmits the malfunction to at least one of the other communications terminals via the at least one interconnector.

* * * * *

UNITED STATES PATENT AND TRADEMARK OFFICE
CERTIFICATE OF CORRECTION

PATENT NO. : 5,996,094

DATED : November 30, 1999

INVENTOR(S): KAN ITO

Page 1 of 2

It is certified that error appears in the above-identified patent and that said Letters Patent is hereby corrected as shown below:

COLUMN 1,
Line 16, "The standardization" should read --Standardization--; and
Line 59, "is" should read --is to--.

COLUMN 2,
Line 10, "the remote" should read --remote--;
Line 41, "be now" should read --now be--; and
Line 51, "of" should read --of the--.

COLUMN 3,
Line 12, "a" should be deleted;
Line 16, "sink." should read --sync.--;
Line 50, "of" should read --of the--;
Line 52, "charge" should read --charge,--; and
Line 65, "of" should read --of the--.

UNITED STATES PATENT AND TRADEMARK OFFICE
CERTIFICATE OF CORRECTION

PATENT NO. : 5,996,094

DATED       : November 30, 1999

INVENTOR(S): KAN ITO

It is certified that error appears in the above-identified patent and that said Letters Patent is hereby corrected as shown below:

COLUMN 6,
Line 36, "and processing" should read --and ¶ processing--; and
Line 50, "unit." should read --units.--.

COLUMN 8,
Line 30, "communicate" should read --communicates--.

Signed and Sealed this

Twelfth Day of December, 2000

Attest:

Q. TODD DICKINSON

Attesting Officer       Director of Patents and Trademarks